United States Patent
Ogawa

(10) Patent No.: US 9,515,330 B2
(45) Date of Patent: Dec. 6, 2016

(54) FUEL CELL MODULE

(71) Applicant: HONDA MOTOR CO., LTD., Tokyo (JP)

(72) Inventor: Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 14/241,734

(22) PCT Filed: Oct. 2, 2012

(86) PCT No.: PCT/JP2012/076059
§ 371 (c)(1),
(2) Date: Feb. 27, 2014

(87) PCT Pub. No.: WO2013/058136
PCT Pub. Date: Apr. 25, 2013

(65) Prior Publication Data
US 2014/0220464 A1 Aug. 7, 2014

(30) Foreign Application Priority Data
Oct. 19, 2011 (JP) .................................. 2011-229933

(51) Int. Cl.
*H01M 8/04* (2016.01)
*H01M 8/06* (2016.01)
(Continued)

(52) U.S. Cl.
CPC ..... *H01M 8/04074* (2013.01); *H01M 8/04067* (2013.01); *H01M 8/04738* (2013.01);
(Continued)

(58) Field of Classification Search
CPC ........................................................ H01L 35/32
See application file for complete search history.

(56) References Cited

U.S. PATENT DOCUMENTS 6,120,923 A * 9/2000 Van Dine ................ C01B 3/382
429/420
6,361,891 B1 * 3/2002 Breault ............. H01M 8/04029
429/413
(Continued)

FOREIGN PATENT DOCUMENTS

EP 1 962 362 8/2008
JP 4-280484 10/1992
(Continued)

OTHER PUBLICATIONS

This application is co-pending with U.S. Appl. No. 14/241,726, filed Feb. 27, 2014.
(Continued)

*Primary Examiner* — Jonathan Crepeau
*Assistant Examiner* — Jacob Buchanan
(74) *Attorney, Agent, or Firm* — Rankin, Hill & Clark LLP

(57) ABSTRACT

A fuel cell module includes a fuel cell stack, a partial oxidation reformer, and a heat exchanger. The heat exchanger is provided on one side of the fuel cell stack, and the partial oxidation reformer and the exhaust gas combustor are provided on the other side of the fuel cell stack. The partial oxidation reformer is provided around the exhaust gas combustor. The fuel cell module includes a first thermoelectric converter and a second thermoelectric converter for performing thermoelectric conversion based on a temperature difference between the combustion gas and the oxygen-containing gas.

7 Claims, 10 Drawing Sheets

(51) Int. Cl.
*H01M 8/12* (2016.01)
*H01M 8/24* (2016.01)

(52) U.S. Cl.
CPC ....... *H01M 8/0618* (2013.01); *H01M 8/0625* (2013.01); *H01M 8/1206* (2013.01); *H01M 8/2425* (2013.01); *Y02E 60/50* (2013.01)

(56) References Cited

U.S. PATENT DOCUMENTS

| | | | |
|---|---|---|---|
| 6,376,114 B1* | 4/2002 | Bonville, Jr. | H01M 8/04089 429/425 |
| 6,416,891 B1* | 7/2002 | Condit | H01M 8/04029 429/425 |
| 6,770,106 B1 | 8/2004 | Okamoto et al. | |
| 6,986,959 B2* | 1/2006 | Clark | H01M 8/04014 429/440 |
| 2001/0004500 A1* | 6/2001 | Grasso | H01M 8/04119 429/425 |
| 2004/0038095 A1 | 2/2004 | Kushibiki et al. | |
| 2004/0101750 A1* | 5/2004 | Burch | H01M 8/04022 429/200 |
| 2005/0089731 A1 | 4/2005 | Ogiwara et al. | |
| 2005/0164051 A1 | 7/2005 | Venkataraman et al. | |
| 2006/0107594 A1 | 5/2006 | Kuwaba | |
| 2006/0251940 A1* | 11/2006 | Bandhauer | H01M 8/04014 429/414 |
| 2008/0008646 A1 | 1/2008 | Kaye | |
| 2008/0060695 A1* | 3/2008 | Brignone | H01L 35/30 136/206 |
| 2009/0205342 A1* | 8/2009 | Jang | B60H 1/00478 62/3.3 |
| 2009/0263689 A1 | 10/2009 | Homma | |
| 2010/0236595 A1* | 9/2010 | Bell | F01P 9/06 136/205 |
| 2011/0048484 A1 | 3/2011 | Gao et al. | |
| 2011/0250513 A1 | 10/2011 | Akikusa | |

FOREIGN PATENT DOCUMENTS

| | | |
|---|---|---|
| JP | 6-103994 | 4/1994 |
| JP | 2000-251914 | 9/2000 |
| JP | 2003-086223 | 3/2003 |
| JP | 2003-229151 | 8/2003 |
| JP | 2004-087169 | 3/2004 |
| JP | 2004-319363 | 11/2004 |
| JP | 2005-166439 | 6/2005 |
| JP | 2006-143564 | 6/2006 |
| JP | 2007-042437 | 2/2007 |
| JP | 2007-311160 | 11/2007 |
| JP | 2008-218277 | 9/2008 |
| JP | 2008-251362 | 10/2008 |
| JP | 2010-218888 | 9/2010 |
| WO | 01/47800 | 7/2001 |
| WO | 2009/028169 | 3/2009 |

OTHER PUBLICATIONS

Japanese Office Action dated Aug. 19, 2014, Application No. 2011-229925; partial English translation included.
Japanese Office Action dated Sep. 24, 2014, Application No. 2011-229933; partial English translation included.

* cited by examiner

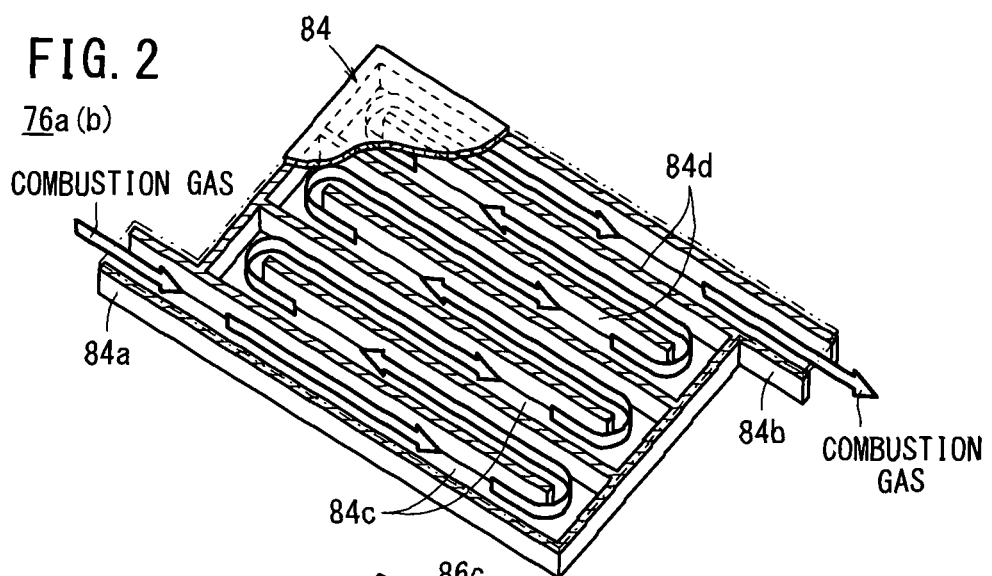
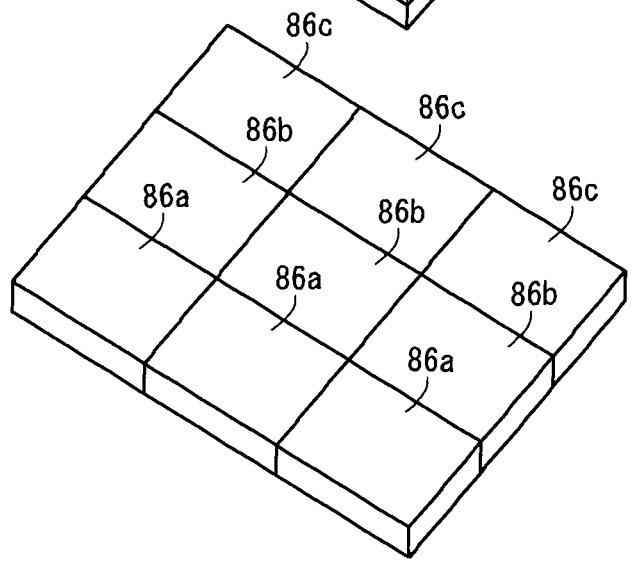
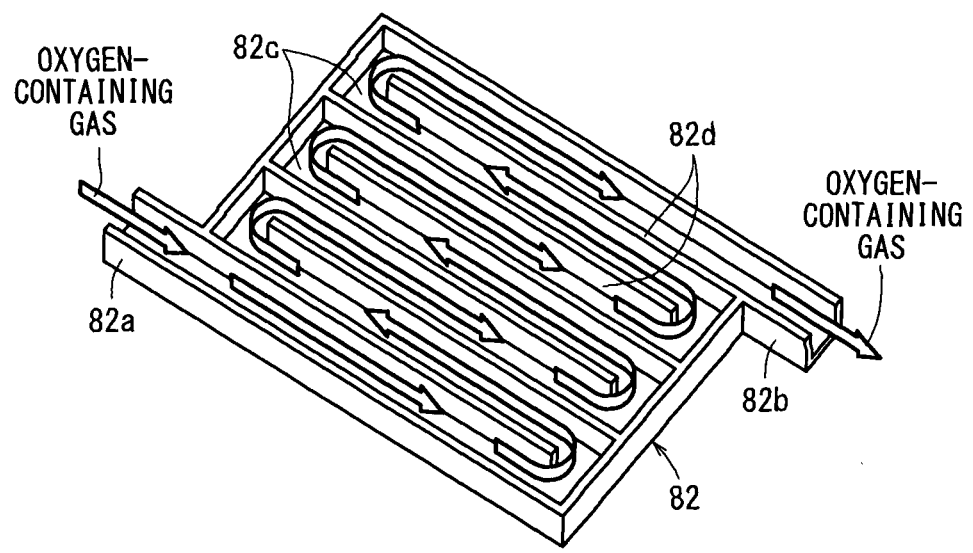
FIG. 2

FIG. 6
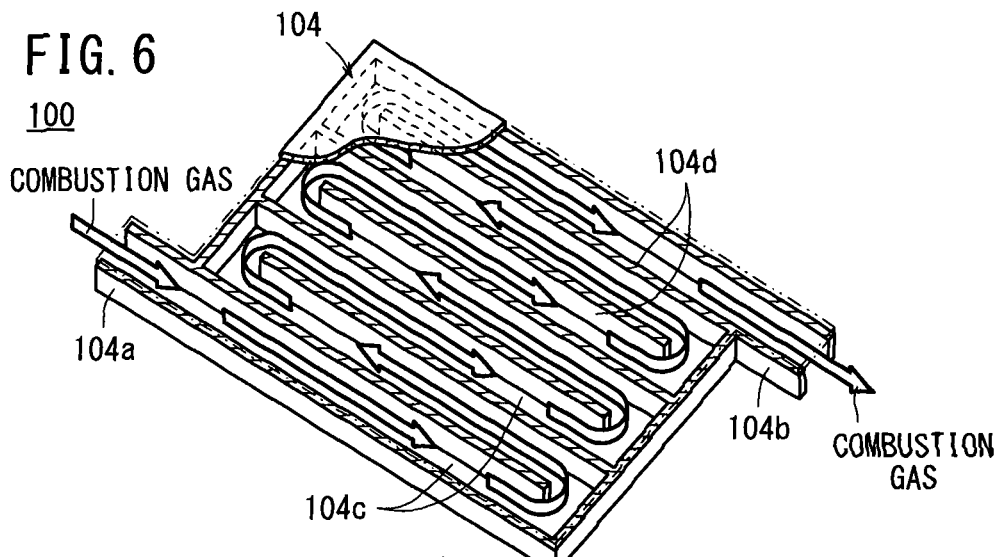
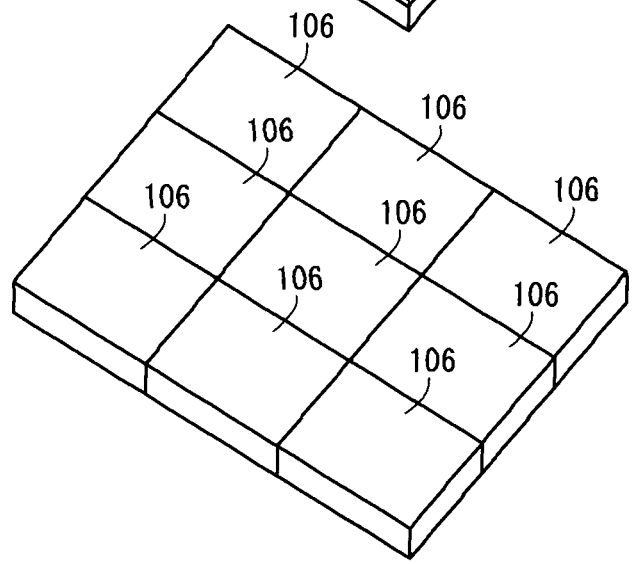
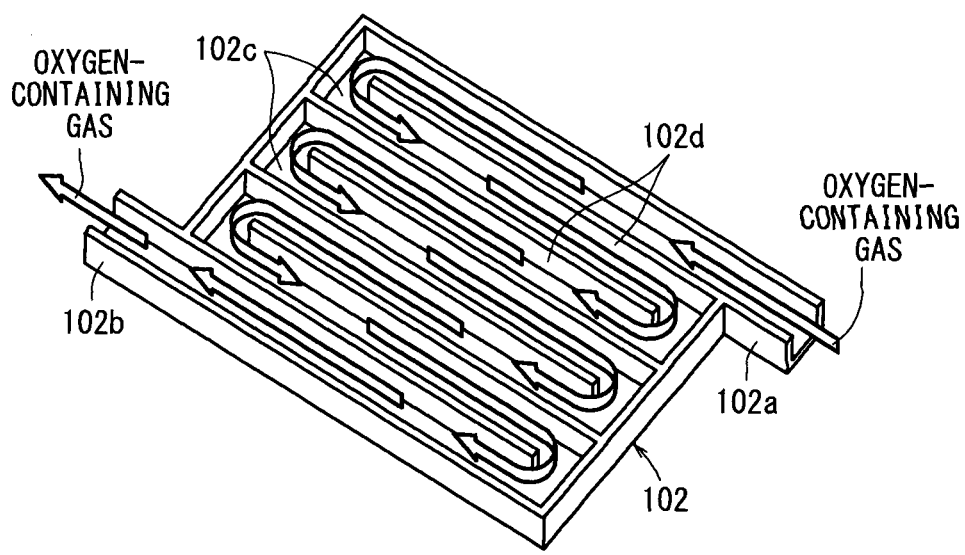

FUEL CELL MODULE

TECHNICAL FIELD

The present invention relates to a fuel cell module including a fuel cell stack for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly (MEA). The electrolyte electrode assembly is interposed between separators (bipolar plates). In use, generally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a hydrocarbon raw fuel of a fossil fuel or the like, such as methane or LNG undergoes partial oxidation reforming or steam reforming to produce a reformed gas (fuel gas).

In this case, since the partial oxidation reformer induces exothermic reaction, reaction can be started at relatively low temperature and operation can be started efficiently, and the follow up performance is good. In contrast, the steam reformer has good reforming efficiency.

For example, a fuel cell system disclosed in Japanese Laid-Open Patent Publication No. 2010-218888 (hereinafter referred to as the conventional technique 1) is known. In the fuel cell system, as shown in FIG. 9, a fuel processing system 1a is provided. The fuel processing system 1a has a reformer 2a and a burner combustor 3a.

In the fuel cell system, an air supply apparatus 5a is controlled based on an indicator value of a flow rate meter 4a. When the air is not supplied by the air supply apparatus 5a, the indicator value of the flow rate meter 4a is corrected to a value indicating that the flow rate is zero. According to the disclosure, in the structure, since the indicator value of the flow rate meter 4a indicates the flow rate of the actual supplied air, the flow rate of the air supplied by the air supply apparatus 5a can be regulated with a high degree of accuracy.

Further, in a partial oxidation reformer disclosed in Japanese Laid-Open Patent Re-publication No. WO 01/047800 (PCT) (hereinafter referred to as the conventional technique 2), as shown in FIG. 10, a reformer 1b has dual wall structure including a housing 2b, and partition walls 3b provided in the housing 2b. A reforming reaction unit 4b is provided between the partition walls 3b, and a space between the housing 2b and the partition walls 3b is used as a raw material gas passage 5b around the reforming reaction unit 4b.

Heat insulation of the reforming reaction unit 4b is performed by the raw material gas passage 5b to reduce non-uniformity in the temperature inside the reforming reaction unit 4b. The raw material gas in the raw material gas passage 5b is heated beforehand by the reaction heat in the reforming reaction unit 4b. Thus, the heat efficiency in the reformer 1b is improved by self-heat collection, and a preheater for heating the raw material gas beforehand is formed integrally between the raw material gas passage 5b and the reforming reaction unit 4b.

According to the disclosure, in the structure, in the reforming reaction unit 4b, in the case where a hydrogen rich reforming gas is produced by reaction including partial oxidation from the raw material gas, non-uniformity in the temperature inside the reforming reaction unit 4b is reduced, improvement in the heat efficiency is achieved, and the reformer has simple and compact structure.

SUMMARY OF INVENTION

However, in the conventional technique 1, the flow rate of the fluid is corrected, and correction based on the temperature is not considered. Thus, if the volume varies depending on the temperature range, the supplied fluid may exceed the fluid control range undesirably. Further, in the conventional technique 1, since a solid polymer electrolyte fuel cell stack is used, it is required to cool the reformed gas discharged from the reformer 2a. Therefore, a large loss in heat energy occurs, and the heat energy cannot be utilized efficiently.

Further, in the conventional technique 2, since heat exchange occurs between the raw material gas and the reformed gas, the temperature of the reforming gas is decreased. Further, since the reformer for solid polymer electrolyte fuel cells is adopted, at the time of passing the reformed gas to a CO remover, it is required to decrease the temperature of the reformed gas, and the heat energy cannot be utilized efficiently.

The present invention has been made to solve the problems of this type, and an object of the present invention is to provide a fuel cell module which makes it possible to suppress the loss of heat energy, facilitate thermally self-sustaining operation, achieve reduction in cost and size, and improve the power generation efficiency.

The present invention relates to a fuel cell module including a fuel cell stack for generating electricity by electrochemical reactions of a fuel gas and an oxygen-containing gas, a partial oxidation reformer for reforming a mixed gas of an oxygen-containing gas and a raw fuel chiefly containing hydrocarbon to produce the fuel gas, and supplying the fuel gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce a combustion gas, and a heat exchanger for raising a temperature of the oxygen-containing gas by heat exchange with the combustion gas, and supplying the oxygen-containing gas to the fuel cell stack.

In the fuel cell module, the heat exchanger is provided on one side of the fuel cell stack, and the partial oxidation reformer and the exhaust gas combustor are provided on the other side of the fuel cell stack. The partial oxidation reformer is provided around the exhaust gas combustor. The fuel cell module includes a thermoelectric converter for performing thermoelectric conversion based on a temperature difference between the combustion gas and the oxygen-containing gas.

In the present invention, the heat exchanger is provided on one side of the fuel cell stack, and the partial oxidation reformer and the exhaust gas combustor are provided on the other side of the fuel cell stack. Thus, heat radiation from the fuel cell stack is minimized, and variation in the temperature distribution in the fuel cell stack is reduced. Accordingly, the heat energy losses can be suppressed, and thermally self-sustaining operation is facilitated easily.

Thermally self-sustaining operation herein means operation where the entire heat quantity required for operation of the fuel cell system is supplied within the fuel cell system, and where the operating temperature of the fuel cell system is maintained using only heat energy generated in the fuel cell system, without supplying additional heat from the outside.

Further, the partial oxidation reformer is provided around the exhaust gas combustor. In the structure, in the state where the self-ignition temperature is maintained, the fuel exhaust gas and the oxygen-containing exhaust gas discharged from the fuel cell stack can be supplied into the exhaust gas combustor. Accordingly, in the exhaust gas combustor, stability in combustion is improved suitably, and thermally self-sustaining operation is facilitated easily.

Moreover, as a reformer, only the partial oxidation reformer is provided without requiring any steam reformer. Thus, since the water supply system for supplying water vapor is not provided, reduction in the number of parts is achieved, and reduction in the cost and size of the entire fuel cell module is achieved.

Further, the fuel cell module includes the thermoelectric converter for performing thermoelectric conversion based on the temperature difference between the combustion gas and the oxygen-containing gas. Thus, the temperature difference between the combustion gas and the oxygen-containing gas, i.e., the heat energy can be collected as electrical energy. In particular, it becomes possible to improve the power generation efficiency without any losses in the start-up time. Further, since the temperature of the combustion gas is decreased, generation of waste heat is suppressed. Moreover, since the temperature of the oxygen-containing gas is increased, thermally self-sustaining operation is facilitated.

The combustion gas herein is a gas generated by the exhaust gas combustor. The combustion gas is a heating medium which can provide heat by performing heat exchange with a fluid to be heated (e.g., another gas). After heat energy is released from the combustion gas, the combustion gas is referred to as the exhaust gas.

BRIEF DESCRIPTION OF DRAWINGS

FIG. 2 is an exploded perspective view showing main components of first and second thermoelectric converters of the fuel cell module;

FIG. 6 is a partial exploded perspective view showing main components of a thermoelectric converter of a fuel cell module according to a third embodiment of the present invention;

DESCRIPTION OF EMBODIMENTS

Figure 1:
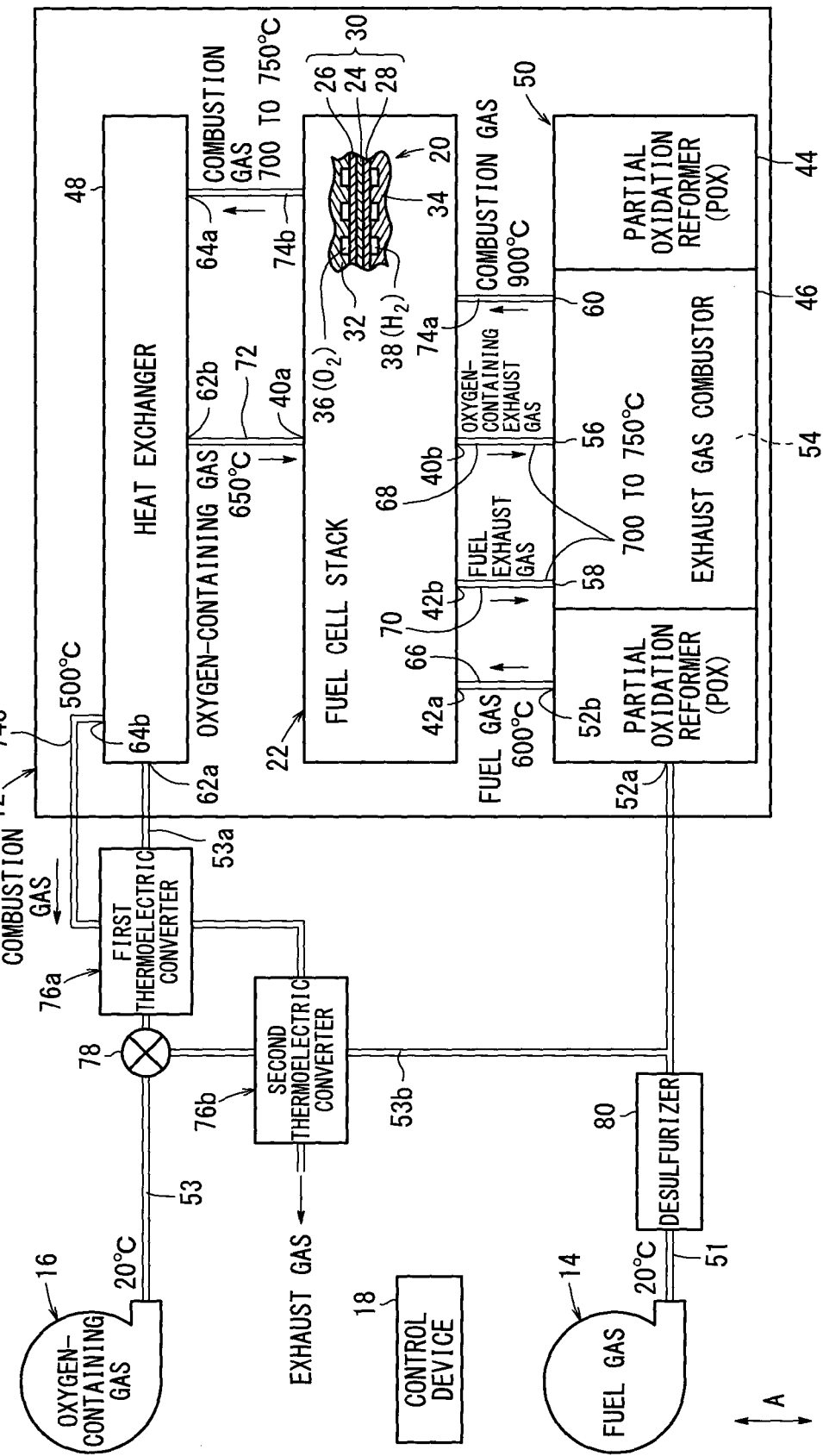
FIG. 1 is a diagram schematically showing a structure of a fuel cell system including a fuel cell module according to a first embodiment of the present invention.

A fuel cell system 10 shown in FIG. 1 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) chiefly containing hydrocarbon to the fuel cell module 12, an oxygen-containing gas supply apparatus (including an air pump) 16 for supplying the oxygen-containing gas to the fuel cell module 12, and a control device 18 for controlling the amount of electrical energy generated in the fuel cell module 12.

The fuel cell module 12 includes a fuel cell stack 22 formed by stacking a plurality of solid oxide fuel cells 20 in a vertical direction indicated by an arrow A. For example, the fuel cell 20 includes an electrolyte electrode assembly 30 (MEA). The electrolyte electrode assembly 30 includes a cathode 26, an anode 28, and an electrolyte 24 interposed between the cathode 26 and the anode 28. For example, the electrolyte 24 is made of ion-conductive solid oxide such as stabilized zirconia.

A cathode side separator 32 and an anode side separator 34 are provided on both sides of the electrolyte electrode assembly 30. An oxygen-containing gas flow field 36 for supplying an oxygen-containing gas to the cathode 26 is formed in the cathode side separator 32, and a fuel gas flow field 38 for supplying a fuel gas to the anode 28 is formed in the anode side separator 34. As the fuel cell 20, various types of conventional SOFC can be adopted.

An oxygen-containing gas supply passage 40a, an oxygen-containing gas discharge passage 40b, a fuel gas supply passage 42a, and a fuel gas discharge passage 42b extend through the fuel cell stack 22. The oxygen-containing gas supply passage 40a is connected to an inlet of each oxygen-containing gas flow field 36, the oxygen-containing gas discharge passage 40b is connected to an outlet of each oxygen-containing gas flow field 36, the fuel gas supply passage 42a is connected to an inlet of each fuel gas flow field 38, and the fuel gas discharge passage 42b is connected to an outlet of each fuel gas flow field 38.

The fuel cell module 12 includes a partial oxidation reformer (POX) 44 for reforming a mixed gas of a raw fuel chiefly containing hydrocarbon and the oxygen-containing gas, an exhaust gas combustor 46 for combusting the fuel gas discharged from the fuel cell stack 22 as a fuel exhaust gas, and combusting the oxygen-containing gas discharged from the fuel cell stack 22 as an oxygen-containing exhaust gas to produce a combustion gas, and a heat exchanger 48 for raising the temperature of the oxygen-containing gas by heat exchange with the combustion gas, and supplying the oxygen-containing gas to the fuel cell stack 22.

Basically, the fuel cell module 12 is made up of the fuel cell stack 22 and FC (fuel cell) peripheral equipment 50. The FC peripheral equipment 50 includes the partial oxidation reformer 44, the exhaust gas combustor 46, and the heat exchanger 48. The partial oxidation reformer 44 is provided around the exhaust gas combustor 46. The exhaust gas combustor 46 has a columnar (or square pillar) outer shape. The partial oxidation reformer 44 has a ring shape (or square pillar shape) containing the exhaust gas combustor 46.

The raw fuel supply apparatus 14 has a raw fuel channel 51 for supplying the raw fuel to the partial oxidation reformer 44. The oxygen-containing gas supply apparatus 16 has an oxygen-containing gas channel 53 for supplying the oxygen-containing gas from the heat exchanger 48 to the fuel cell stack 22.

The heat exchanger 48 is provided on one side of the fuel cell stack 22, more preferably, on one side (upper side) of the fuel cells 20 in the stacking direction indicated by the arrow A, and the partial oxidation reformer 44 and the exhaust gas combustor 46 are provided on the other side of the fuel cell stack 22, more preferably, on the other side (lower side) of the fuel cells 20 in the stacking direction indicated by the arrow A.

The direction in which the fuel cells 20 are stacked is the same as the direction of gravity. Stated otherwise, the heat exchanger 48 is provided above the fuel cell stack 22 in the direction of gravity, and the partial oxidation reformer 44 and the exhaust gas combustor 46 are provided below the fuel cell stack 22 in the direction of gravity.

The partial oxidation reformer 44 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing hydrogen and CO by partial oxidation reforming. The operating temperature of the partial oxidation reformer 44 is several hundred ° C.

The operating temperature of the fuel cell 20 is high, at several hundred ° C. Methane in the fuel gas is reformed at the anode 28 to obtain hydrogen and CO, and the hydrogen and CO are supplied to the portion of the electrolyte 24 adjacent to the anode 28.

Partial oxidation catalyst (not shown) fills the inside of the partial oxidation reformer 44. An ignition device (not shown) such as an igniter or a glow for ignition at the time of starting operation is provided at the partial oxidation reformer 44. The partial oxidation reformer 44 has a mixed gas inlet port 52a and a fuel gas outlet port 52b. A raw fuel after desulfurization is supplied into the partial oxidation reformer 44 through the mixed gas inlet port 52a, and the reformed gas (fuel gas) after partial oxidation reforming of the raw fuel is discharged from the partial oxidation reformer 44 through the fuel gas outlet port 52b.

A combustion chamber 54 is provided in the exhaust gas combustor 46. An oxygen-containing exhaust gas inlet port 56, a fuel exhaust gas inlet port 58, and exhaust gas outlet port 60 are connected to the combustion chamber 54. At the combustion chamber 54, an ignition device (not shown) such as an igniter or a glow for ignition of the mixed gas of the reduction gas (fuel gas) and the oxygen-containing gas at the time of starting operation is provided.

A heating space containing a plurality of oxygen-containing gas pipes (not shown) is formed in the heat exchanger 48, and the oxygen-containing gas flowing through the oxygen-containing gas pipes is heated by the hot combustion gas supplied to the heating space. The heat exchanger 48 has an oxygen-containing gas supply port 62a and an oxygen-containing gas discharge port 62b connected to the inlets and the outlets of the oxygen-containing gas pipes, and a combustion gas supply port 64a and a combustion gas discharge port 64b connected to the heating space.

The fuel gas supply passage 42a of the fuel cell stack 22 and the fuel gas outlet port 52b of the partial oxidation reformer 44 are connected through a fuel gas channel 66.

The oxygen-containing gas discharge passage 40b of the fuel cell stack 22 and the oxygen-containing exhaust gas inlet port 56 of the exhaust gas combustor 46 are connected through an oxygen-containing exhaust gas channel 68. The fuel gas discharge passage 42b of the fuel cell stack 22 and the fuel exhaust gas inlet port 58 of the exhaust gas combustor 46 are connected through a fuel exhaust gas channel 70. The oxygen-containing gas supply passage 40a of the fuel cell stack 22 and the oxygen-containing gas discharge port 62b of the heat exchanger 48 are connected through an oxygen-containing gas channel 72.

One end of a combustion gas channel 74a is connected to the exhaust gas outlet port 60 of the exhaust gas combustor 46, and the other end of the combustion gas channel 74a is connected to the fuel cell stack 22. One end of a combustion gas channel 74b for discharging the combustion gas is connected to the fuel cell stack 22, and the other end of the combustion gas channel 74b is connected to the combustion gas supply port 64a of the heat exchanger 48. One end of a combustion gas channel 74c is connected to the combustion gas discharge port 64b of the heat exchanger 48, and the other end of the combustion gas channel 74c is connected in series to a first thermoelectric converter 76a and a second thermoelectric converter 76b.

The first thermoelectric converter 76a is placed in a first oxygen-containing gas supply channel 53a of the oxygen-containing gas channel 53, and the second thermoelectric converter 76b is placed in a second oxygen-containing gas supply channel 53b of the oxygen-containing gas channel 53. The oxygen-containing gas is distributed to the first oxygen-containing gas supply channel 53a and the second oxygen-containing gas supply channel 53b through an oxygen-containing gas regulator valve 78 provided in the oxygen-containing gas channel 53.

The raw fuel supply apparatus 14 includes a desulfurizer 80 for removing sulfur compounds in the city gas (raw fuel). The desulfurizer 80 is provided in a middle of the raw fuel channel 51. The raw fuel channel 51 is connected to the mixed gas inlet port 52a of the partial oxidation reformer 44.

The oxygen-containing gas supply apparatus 16 includes the oxygen-containing gas regulator valve 78 for distributing the oxygen-containing gas from the oxygen-containing gas channel 53 to the heat exchanger 48 and the partial oxidation reformer 44, i.e., the first oxygen-containing gas supply channel 53a and the second oxygen-containing gas supply channel 53b. The first oxygen-containing gas supply channel 53a is connected to the oxygen-containing gas supply port 62a of the heat exchanger 48. The second oxygen-containing gas supply channel 53b is connected to the raw fuel channel 51 at a position between the desulfurizer 80 and the partial oxidation reformer 44.

As shown in FIG. 2, the first thermoelectric converter 76a includes a first channel member 82 as a passage of the oxygen-containing gas as a medium to be heated, a second channel member 84 as a passage of the combustion gas as a heating medium, and a plurality of thermoelectric conversion elements 86a, 86b, and 86c each having a different thermoelectric conversion temperature. The thermoelectric conversion elements 86a, 86b, and 86c are provided between the first channel member 82 and the second channel member 84.

The first channel member 82 has a box shape, and includes a serpentine oxygen-containing gas channel 82c extending in a serpentine pattern between an oxygen-containing gas inlet 82a and an oxygen-containing gas outlet 82b. The serpentine oxygen-containing gas channel 82c is formed by partition plates 82d provided alternately in a zigzag pattern in the first channel member 82.

The second channel member 84 has a box shape, and includes a serpentine combustion gas channel 84c extending in a serpentine pattern between a combustion gas inlet 84a and a combustion gas outlet 84b. The serpentine combustion gas channel 84c is formed by partition plates 84d provided alternately in a zigzag pattern in the second channel member 84. The combustion gas in the serpentine combustion gas channel 84c and the oxygen-containing gas in the serpentine oxygen-containing gas channel 82c flow in parallel to each other.

Both ends of the thermoelectric conversion elements 86a, 86b, and 86c are sandwiched between the first channel member 82 and the second channel member 84, and the thermoelectric conversion elements 86a, 86b, and 86c are capable of generating an electromotive force by the temperature between these ends. A plurality of the thermoelectric conversion elements 86a (though three thermoelectric conversion elements 86a are provided in FIG. 2, the number of the thermoelectric conversion elements 86a can be determined arbitrarily. Likewise, the number of the thermoelectric conversion elements 86b and the thermoelectric conversion elements 86c can be determined arbitrarily.) are provided on the upstream side of the serpentine oxygen-containing gas channel 82c and the serpentine combustion gas channel 84c. The thermoelectric conversion elements 86a are hot temperature type thermoelectric conversion elements having a high thermoelectric conversion temperature.

The thermoelectric conversion elements 86b provided in the mid-portions of the serpentine oxygen-containing gas channel 82c and the serpentine combustion gas channel 84c are intermediate temperature type thermoelectric conversion elements having an intermediate thermoelectric conversion temperature. The thermoelectric conversion elements 86c provided on the downstream side of the serpentine oxygen-containing gas channel 82c and the serpentine combustion gas channel 84c are low temperature thermoelectric conversion elements having a low thermoelectric conversion temperature.

The second thermoelectric converter 76b has structure identical to the first thermoelectric converter 76a. The constituent elements of the second thermoelectric converter 76b that are identical to those of the first thermoelectric converter 76a are labeled with the same reference numeral, and description thereof will be omitted.

Figure 3:
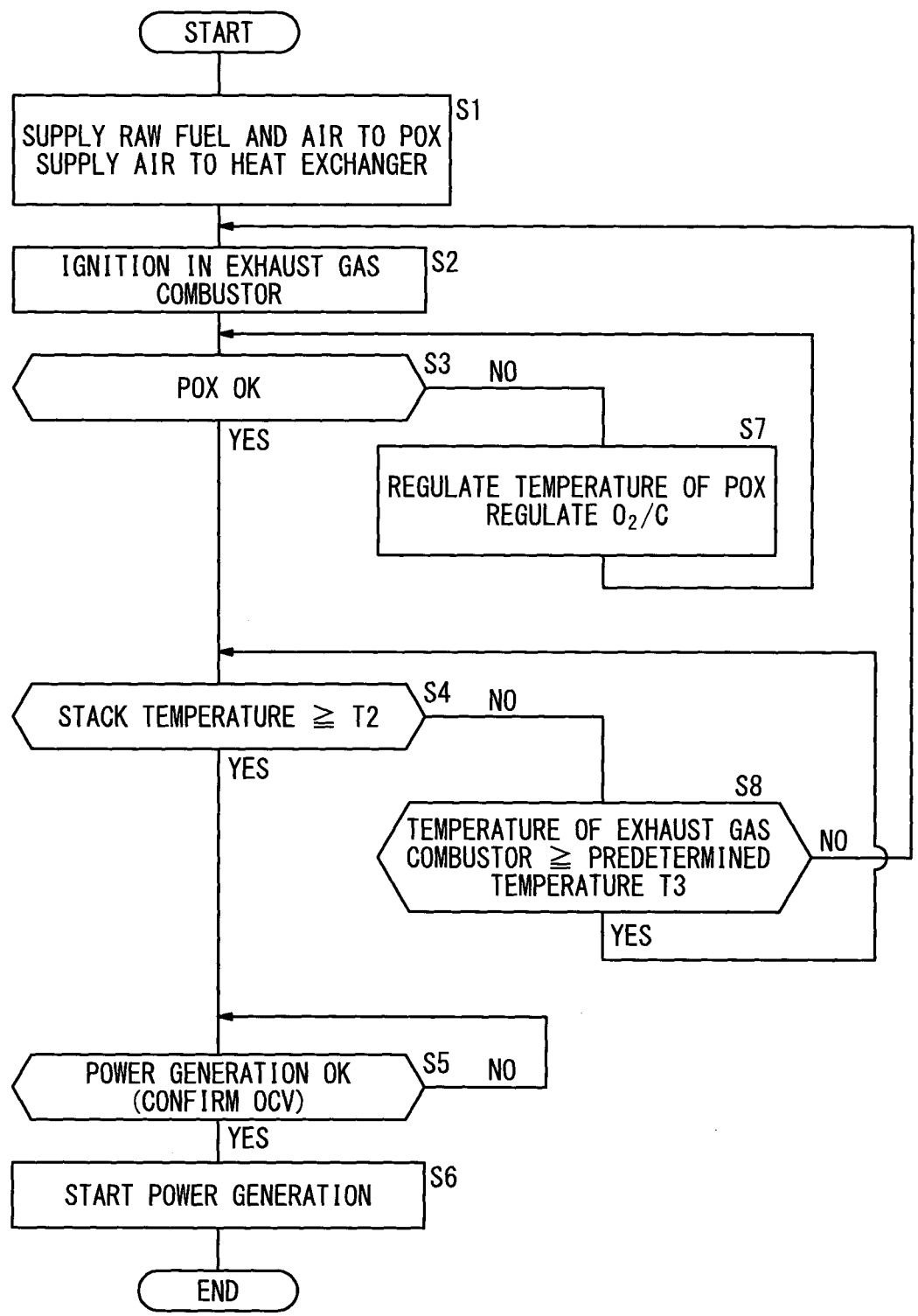
FIG. 3 is a flow chart showing operation of the fuel cell system.

Next, operation of the fuel cell system 10 will be described below with reference to a flow chart shown in FIG. 3.

Firstly, at the time of starting operation of the fuel cell system 10, the opening angle of the oxygen-containing gas regulator valve 78 is determined. Specifically, the raw fuel supply apparatus 14 is operated, and the opening angle of the oxygen-containing gas regulator valve 78 is adjusted such that the air (oxygen-containing gas) and the raw fuel such as the city gas (containing $CH_4$, $C_2H_6$, $C_3H_8$, $C_4H_{10}$) required for partial oxidation reforming are supplied (step S1). The control of the partial oxidation reforming is performed based on the air fuel ratio ($O_2/C$) (the number of oxygen moles in the supplied air/the number of carbon moles in the supplied raw fuel). The air and raw fuel are supplied to the partial oxidation reformer 44 at the optimal air-fuel ratios.

In the raw fuel supply apparatus 14, sulfur is removed from the raw fuel supplied to the raw fuel channel 51 by the desulfurizer 80, and thereafter the raw fuel is supplied to the mixed gas inlet port 52a of the partial oxidation reformer 44.

In the oxygen-containing gas supply apparatus 16, after the air is supplied to the oxygen-containing gas channel 53, a predetermined amount of the air is distributed to the first oxygen-containing gas supply channel 53a, and a predetermined amount of the air is distributed to the second oxygen-containing gas supply channel 53b, through the oxygen-containing gas regulator valve 78. The air distributed to the second oxygen-containing gas supply channel 53b is mixed with the raw fuel in the raw fuel channel 51, and the air is supplied to the mixed gas inlet port 52a of the partial oxidation reformer 44.

In the partial oxidation reformer 44, ignition is performed by an ignition device (not shown). Thus, partial oxidation reforming by the partial oxidation reformer 44 is started. For example, if $O_2/C=0.5$, partial oxidation reaction ($2CH_4+O_2 \rightarrow 4H_2+2CO$) occurs. The partial oxidation reaction is exothermic reaction, and a hot reduction gas (fuel gas at about 600° C.) is produced by the partial oxidation reformer 44.

The hot reduction gas is supplied to the fuel gas supply passage 42a of the fuel cell stack 22 through the fuel gas channel 66. In the fuel cell stack 22, after the hot reduction gas flows through the fuel gas flow field 38, the hot reduction gas is discharged from the fuel gas discharge passage 42b into the fuel exhaust gas channel 70. The reduction gas flows into the combustion chamber 54 of the exhaust gas combustor 46 from the fuel exhaust gas inlet port 58 connected to the fuel exhaust gas channel 70.

In the oxygen-containing gas supply apparatus 16, the air supplied to the first oxygen-containing gas supply channel 53a flows from the oxygen-containing gas supply port 62a to the heat exchanger 48. While the air is moving through the oxygen-containing gas pipes, heat exchange between the air and the combustion gas (described later) supplied into the heating space occurs, and the air is heated. The heated air is supplied to the oxygen-containing gas supply passage 40a of the fuel cell stack 22 through the oxygen-containing gas channel 72.

In the fuel cell stack 22, after the heated air flows through the oxygen-containing gas flow field 36, the air is discharged from the oxygen-containing gas discharge passage 40b into the oxygen-containing exhaust gas channel 68. The oxygen-containing exhaust gas channel 68 is opened to the combustion chamber 54 of the exhaust gas combustor 46, and the air flows into the combustion chamber 54. Therefore, the fuel exhaust gas and the oxygen-containing exhaust gas flow into the combustion chamber 54. When the temperature in the combustion chamber 54 exceeds the self-ignition temperature of the fuel gas, combustion by the air and the fuel gas is started in the combustion chamber 54. If the temperature in the combustion chamber 54 does not exceed the self-ignition temperature, ignition is performed by an ignition device (not shown) (step S2).

The combustion gas produced in the combustion chamber 54 flows from the exhaust gas outlet port 60, and the combustion gas is supplied to the fuel cell stack 22 through the combustion gas channel 74a to raise the temperature of the fuel cell stack 22. Further, the combustion gas flows through the combustion gas channel 74b into the combustion gas supply port 64a of the heat exchanger 48.

Thus, the combustion gas is supplied into the heating space in the heat exchanger 48, and heats the oxygen-containing gas flowing through the oxygen-containing gas pipes. Then, the combustion gas flows from the combustion gas discharge port 64b through the combustion gas channel 74c, and then, the combustion gas is supplied into the first thermoelectric converter 76a and the second thermoelectric converter 76b successively.

As shown in FIG. 2, in the first thermoelectric converter 76a and the second thermoelectric converter 76b, the oxygen-containing gas as the external air is supplied from the oxygen-containing gas inlet 82a of the first channel member 82 to the serpentine oxygen-containing gas channel 82c, and the combustion gas is supplied from the combustion gas inlet 84a of the second channel member 84 into the serpentine combustion gas channel 84c. Thus, temperature differences occur between both ends of the thermoelectric conversion elements 86a, 86b, and 86c between the serpentine oxygen-containing gas channel 82c and the serpentine combustion gas channel 84c, and the heat energy is collected as electrical energy.

As described above, since the heated air, the heated fuel gas, and the combustion gas flow through the fuel cell stack 22, the temperature of the fuel cell stack 22 is increased. In the meanwhile, the partial oxidation reformer 44 is heated by the exhaust gas combustor 46. It is determined whether or not the partial oxidation reformer 44 is in a predetermined state where operation of the fuel cell stack 22 can be performed (step S3).

Figure 4:
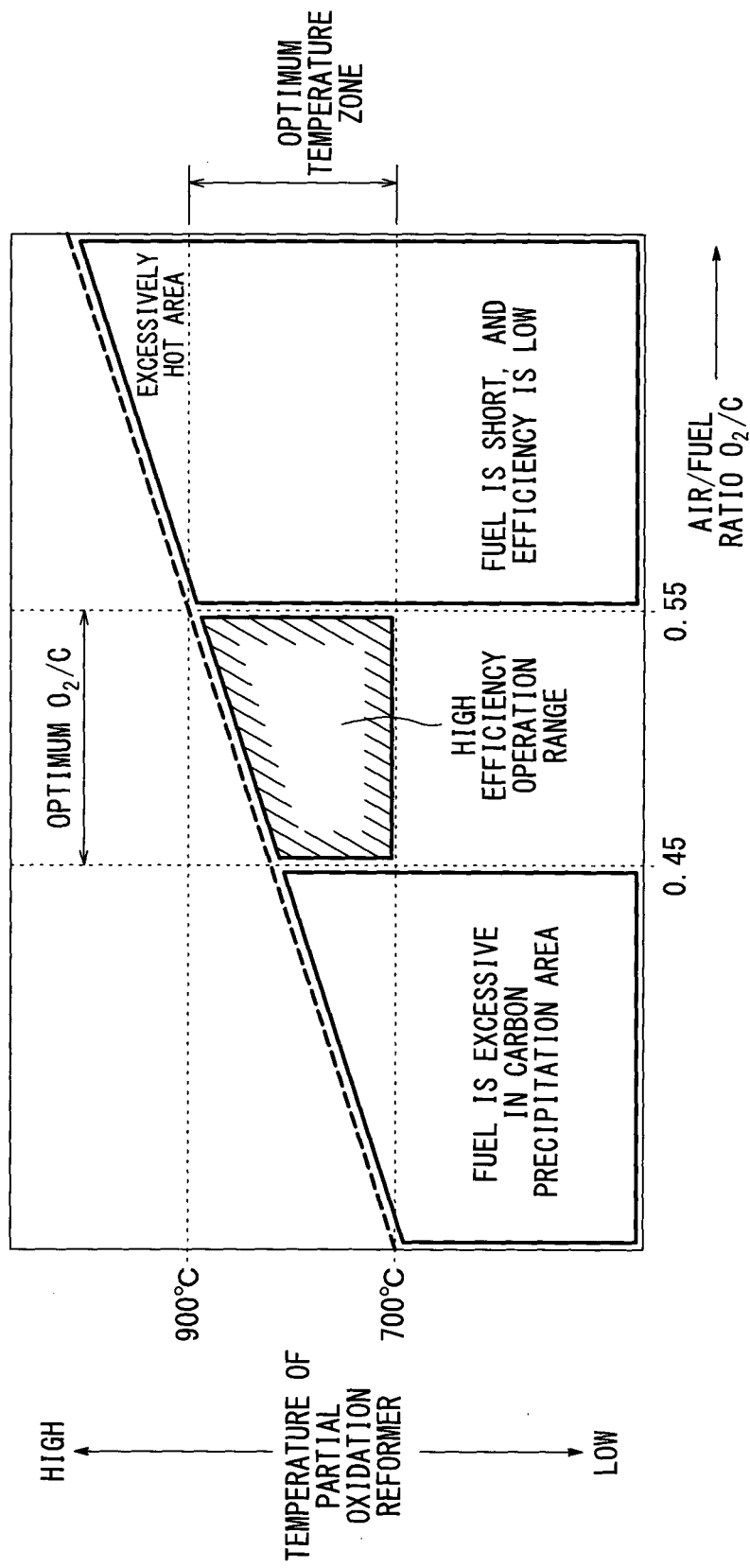
FIG. 4 is a graph showing an optimum map of a partial oxidation reformer of the fuel cell module.

Specifically, as shown in FIG. 4, a high efficiency operation range where highly efficient reaction occurs is determined as a map based on the temperature and the air/fuel ratio of the partial oxidation reformer 44. In the case where the temperature T1 of the partial oxidation reformer 44 is in the range of 700° C.≤T1≤900° C., and the air/fuel ratio is in the range of 0.45≤$O_2$/C≤0.55, it is determined that the reforming state of the partial oxidation reformer 44 is OK.

If it is determined that reforming state of the partial oxidation reformer 44 is OK (YES in step S3), the process proceeds to step S4. In step S4, it is determined whether or not the temperature of the fuel cell stack 22 (stack temperature) is T2 (e.g., 650° C.) or more. If it is determined that the stack temperature is T2 or more (YES in step S4), the process proceeds to step S5.

In step S5, it is determined whether or not power generation can be performed in the fuel cell stack 22. Specifically, OCV (open-circuit voltage) of the fuel cell 20 is measured, and when the OCV reaches a predetermined value, it is determined that power generation can be performed in the fuel cell stack 22 (YES in step S5). Thus, power generation is started in the fuel cell stack 22 (step S6).

During power generation of the fuel cell stack 22, in the same manner as in the case of the start-up operation, the air flows through the oxygen-containing gas flow field 36, and the fuel gas flows through the fuel gas flow field 38. Therefore, the air is supplied to the cathode 26 of each fuel cell 20, and the fuel gas is supplied to the anode 28 of each fuel cell 20 to induce chemical reactions at the cathode 26 and the anode 28 for generating electricity.

The air partially consumed in the reaction (containing unconsumed air) is discharged as oxygen-containing exhaust gas to the oxygen-containing exhaust gas channel 68. Further, the fuel gas partially consumed in the reaction (containing unconsumed fuel gas) is discharged as the fuel exhaust gas to the fuel exhaust gas channel 70. The oxygen-containing exhaust gas and the fuel exhaust gas are supplied to the exhaust gas combustor 46, and combusted in the exhaust gas combustor 46. In the exhaust gas combustor 46, when the temperature of the fuel gas exceeds the self-ignition temperature of the fuel gas, combustion by the air and the fuel gas is started in the combustion chamber 54.

In step S3, if the reforming state of the partial oxidation reformer 44 is NG (NO in step S3), the process proceeds to step S7. In step S7, the temperature of the partial oxidation reformer 44 is regulated, and the raw fuel and the air ($O_2$/C) supplied to the partial oxidation reformer 44 are regulated.

Further, in step S4, if the stack temperature is less than T2 (NO in step S4), the process proceeds to step S8. In step S8, it is determined whether the temperature of the exhaust gas combustor 46 is a predetermine temperature T3 (e.g., 900° C.) or more. If it is determined that the temperature of the exhaust gas combustor 46 is the predetermined temperature T3 or more (YES in step S8), the process returns to step S4. If it is determined that the temperature of the exhaust gas combustor 46 is less than the predetermined temperature T3 (NO in step S8), the process returns to step S2.

In the first embodiment, the heat exchanger 48 is provided on one side of the fuel cell stack 22, and the partial oxidation reformer 44 and the exhaust gas combustor 46 are provided on the other side of the fuel cell stack 22. Thus, heat radiation from the fuel cell stack 22 is minimized, and variation in the temperature distribution in the fuel cell stack 22 is reduced. Accordingly, the heat energy losses can be suppressed, and thermally self-sustaining operation is facilitated easily.

The thermally self-sustaining operation herein means operation where the entire heat quantity required for operation of the fuel cell system 10 is supplied within the fuel cell system 10, and where the operating temperature of the fuel cell system 10 can be maintained only using the heat generated by the fuel cell system 10, without supplying additional heat from the outside.

Further, the partial oxidation reformer 44 is provided around the exhaust gas combustor 46. In the structure, in the state where the self-ignition temperature is maintained, the fuel exhaust gas and the oxygen-containing exhaust gas discharged from the fuel cell stack 22 can be supplied into the exhaust gas combustor 46. Accordingly, in the exhaust gas combustor 46, stability in combustion is improved suitably, and thermally self-sustaining operation is facilitated easily.

Moreover, as a reformer, only the partial oxidation reformer 44 is provided without requiring any steam reformer. Thus, since the water supply system for supplying water vapor is not provided, reduction in the number of parts can be achieved, and reduction in the cost and size of the entire fuel cell module 12 is achieved.

Further, in the first embodiment, the fuel cell module 12 includes the first thermoelectric converter 76a and the second thermoelectric converter 76b for performing thermoelectric conversion based on the temperature difference between the oxygen-containing gas and the combustion gas. As shown in FIG. 2, the first thermoelectric converter 76a and the second thermoelectric converter 76b include the first channel member 82 as a passage of the oxygen-containing gas as a medium to be heated, the second channel member 84 as a passage of the combustion gas as a heating medium, and the plurality of thermoelectric conversion elements 86a, 86b, and 86c each having a different thermoelectric conversion temperature. The thermoelectric conversion elements 86a, 86b, and 86c are provided between the first channel member 82 and the second channel member 84.

In the structure, the first thermoelectric converter 76a and the second thermoelectric converter 76b can collect electrical energy based on the temperature difference between the combustion gas and the oxygen-containing gas. That is, the heat energy can be collected as electrical energy. In particular, it becomes possible to improve the power generation efficiency without any losses in the start-up time. Further, since the temperature of the combustion gas is decreased, generation of waste heat is suppressed. Moreover, since the temperature of the oxygen-containing gas is increased, thermally self-sustaining operation is facilitated. Instead of providing the first thermoelectric converter 76a and the second thermoelectric converter 76b, only one of the first thermoelectric converter 76a and the second thermoelectric converter 76b may be provided.

The combustion gas herein is a gas produced by the exhaust gas combustor 46. The combustion gas is a heating medium which can provide heat by performing heat exchange with a fluid to be heated (e.g., another gas). After heat energy is released from the combustion gas, the combustion gas is referred to as the exhaust gas.

Further, in the fuel cell module 12, the combustion gas channels 74a to 74c for supplying the combustion gas discharged from the exhaust gas combustor 46 successively to the fuel cell stack 22 and the heat exchanger 48, and the oxygen-containing gas channel 53 for supplying the oxygen-containing gas to the heat exchanger 48 and the partial oxidation reformer 44 are provided. The first thermoelectric converter 76a and the second thermoelectric converter 76b are provided downstream of the heat exchanger 48 in the combustion gas channel 74c, and provided upstream of the heat exchanger 48 and the partial oxidation reformer 44 in the oxygen-containing gas channel 53.

Thus, the temperature difference between the combustion gas and the oxygen-containing gas, i.e., the heat energy can be collected as electrical energy without hindering thermally self-sustaining operation, and it becomes possible to improve the power generation efficiency. Further, since the temperature of the combustion gas is decreased, generation of waste heat is suppressed. Moreover, since the temperature of the oxygen-containing gas is increased, thermally self-sustaining operation is facilitated.

Further, the oxygen-containing gas channel 53 is branched into the first oxygen-containing gas supply channel 53a for supplying the oxygen-containing gas to the heat exchanger 48 and the second oxygen-containing gas supply channel 53b for supplying the oxygen-containing gas to the partial oxidation reformer 44. The oxygen-containing gas regulator valve 78 for regulating distribution of the oxygen-containing gas is provided at the branch portion.

In the system, temperatures of the fuel cell stack 22 and the FC peripheral equipment (BOP) 50 including the heat exchanger 48 can be increased at the same time, and thus, reduction in the start-up time is achieved. Further, since reduction reaction can be induced on the anode side, the start-up time is reduced.

Further, at least one of the first thermoelectric converter 76a and the second thermoelectric converter 76b is provided in the first oxygen-containing gas supply channel 53a or the second oxygen-containing gas supply channel 53b, at a position downstream of the oxygen-containing gas regulator valve 78. Thus, the temperature difference between the combustion gas and the oxygen-containing gas, i.e., the heat energy can be collected as electrical energy without hindering thermally self-sustaining operation, and it becomes possible to improve the power generation efficiency.

Further, since the temperature of the combustion gas is decreased, generation of waste heat is suppressed. Moreover, since the temperature of the oxygen-containing gas is increased, thermally self-sustaining operation is facilitated. Moreover, since the temperature of the oxygen-containing gas is increased on the downstream side of the oxygen-containing gas regulator valve 78, durability of the oxygen-containing gas regulator valve 78 is not impaired. Further, as shown in FIG. 2, in the first thermoelectric converter 76a and the second thermoelectric converter 76b, the combustion gas flowing through the serpentine combustion gas channel 84c and the oxygen-containing gas flowing through the serpentine oxygen-containing gas channel 82c flow in parallel to each other, and the thermoelectric conversion elements 86a, 86b, and 86c each having a different thermoelectric conversion temperature are provided.

Therefore, for example, on the upstream side of the parallel flow, since the temperature difference between the combustion gas and the oxygen-containing gas is large, the hot temperature type thermoelectric conversion element 86a is used. On the downstream side of the parallel flow, since the temperature difference is small, the low temperature type thermoelectric conversion element 86c is used. In this manner, since the optimum thermoelectric conversion elements 86a, 86b, and 86c are used depending on the temperature difference, the efficient thermoelectric conversion can be performed reliably.

Further, in the fuel cell module 12, the heat exchanger 48 is provided on one side of the fuel cell stack 22 in the stacking direction of the fuel cells 20, and the partial oxidation reformer 44 and the exhaust gas combustor 46 are provided on the other side of the fuel cell stack 22 in the stacking direction of the fuel cells 20. Thus, heat radiation from the fuel cell module 12 is minimized, and the heat energy losses can be suppressed. Stated otherwise, thermally self-sustaining operation is facilitated.

Further, the fuel cell module 12 is a solid oxide fuel cell module. Therefore, the fuel cell module 12 is most applicable to high temperature type fuel cells such as SOFC.

Figure 5:
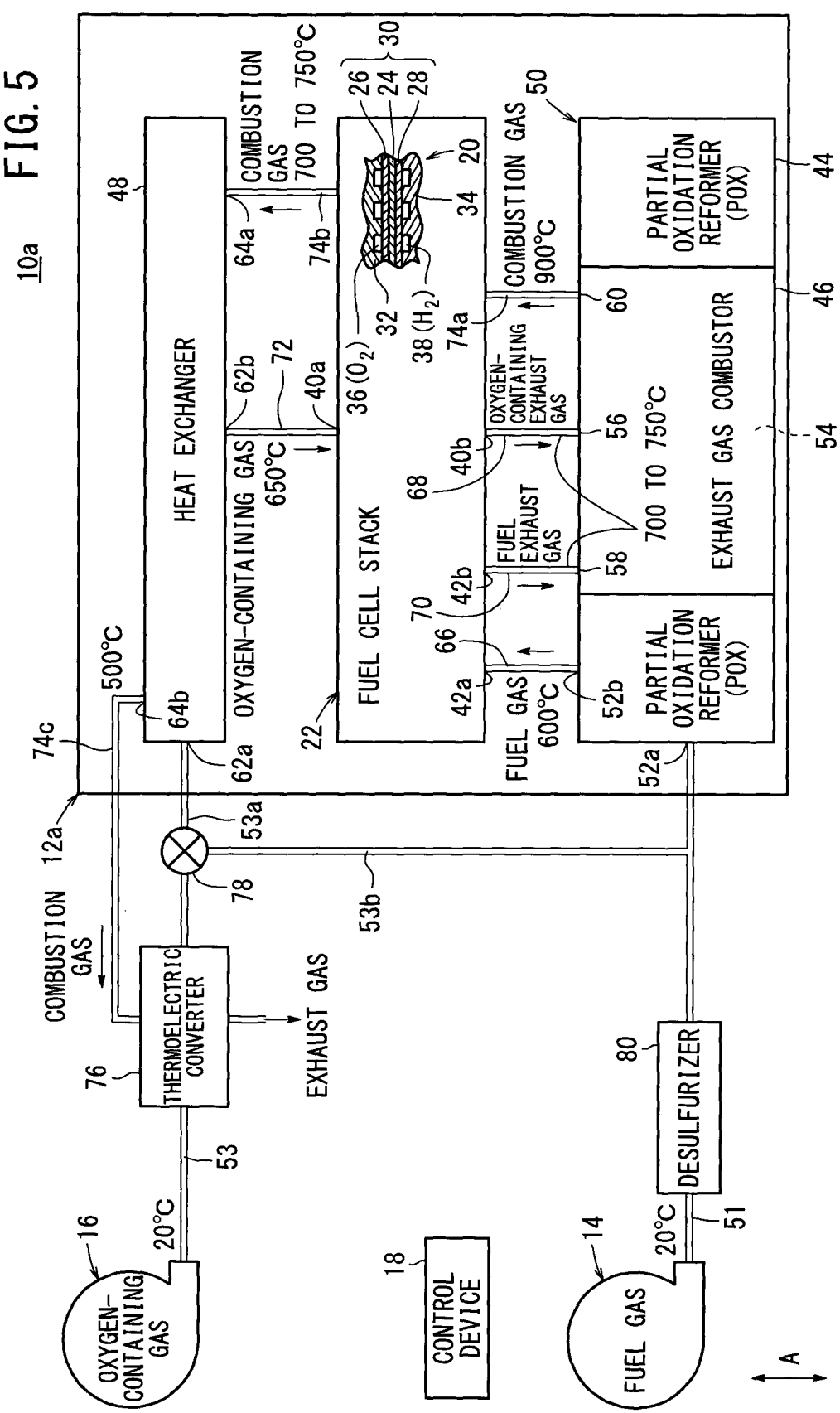
FIG. 5 is a diagram schematically showing a fuel cell system including a fuel cell module according to a second embodiment of the present invention.

As shown in FIG. 5, a fuel cell system 10a includes a fuel cell module 12a according to a second embodiment of the present invention. The constituent elements of the fuel cell module 12a according to the second embodiment of the present invention that are identical to those of the fuel cell module 12 according to the first embodiment are labeled with the same reference numerals, and description thereof will be omitted.

The fuel cell module 12a includes a thermoelectric converter 76, and the thermoelectric converter 76 is provided in the oxygen-containing gas channel 53, at a position upstream of the oxygen-containing gas regulator valve 78. The oxygen-containing gas is supplied to the thermoelectric converter 76 through the oxygen-containing gas channel 53, and the combustion gas is supplied to the thermoelectric converter 76 through the combustion gas channel 74c. The thermoelectric converter 76 has the same structure as the first thermoelectric converter 76a (and the second thermoelectric converter 76b) according to the first embodiment.

In the second embodiment, the same advantages as in the case of the first embodiment are obtained. For example, the temperature difference between the combustion gas and the oxygen-containing gas, i.e., the heat energy can be collected as electrical energy without hindering thermally self-sustaining operation, and it becomes possible to improve the power generation efficiency. Further, since the temperature of the combustion gas is decreased, generation of waste heat is suppressed. Moreover, since the temperature of the oxygen-containing gas is increased, thermally self-sustaining operation is facilitated.

Further, since the thermoelectric converter 76 is provided in the oxygen-containing gas channel 53 at a position upstream of the oxygen-containing gas regulator valve 78, only the single thermoelectric converter 76 can be provided. Thus, structure is simplified economically and advantageously.

FIG. 6 is an exploded perspective view showing main components of a thermoelectric converter 100 of a fuel cell module according to a third embodiment of the present invention.

The thermoelectric converter 100 may be used instead of at least any of the first thermoelectric converter 76*a* and the second thermoelectric converter 76*b* (thermoelectric converter 76) according to the first and second embodiments of the present invention. Likewise, the thermoelectric converter as described later in fourth and fifth embodiments may be used instead of at least any of the first thermoelectric converter 76*a* and the second thermoelectric converter 76*b* (thermoelectric converter 76) according to the first and second embodiments of the present invention.

The thermoelectric converter 100 includes a first channel member 102 as a passage of the oxygen-containing gas, a second channel member 104 as a passage of the combustion gas, and a plurality of thermoelectric conversion elements 106 provided between the first channel member 102 and the second channel member 104. The thermoelectric conversion elements 106 have a predetermined thermoelectric conversion temperature.

The first channel member 102 includes a serpentine oxygen-containing gas channel 102*c* extending in a serpentine pattern between an oxygen-containing gas inlet 102*a* and an oxygen-containing gas outlet 102*b*. The serpentine oxygen-containing gas channel 102*c* is formed by partition plates 102*d* provided alternately in a zigzag pattern in the first channel member 102.

The second channel member 104 includes a serpentine combustion gas channel 104*c* extending in a serpentine pattern between a combustion gas inlet 104*a* and a combustion gas outlet 104*b*. The serpentine combustion gas channel 104*c* is formed by partition plates 104*d* provided alternately in a zigzag pattern in the second channel member 104. The combustion gas in the serpentine combustion gas channel 104*c* and the oxygen-containing gas in the serpentine oxygen-containing gas channel 102*c* flow in a counterflow manner.

In the third embodiment having the above structure, in the thermoelectric converter 100, the combustion gas and the oxygen-containing gas flow in a counterflow manner. The thermoelectric converter 100 includes the plurality of thermoelectric conversion elements 106 having a predetermined thermoelectric conversion temperature. In the structure, in the thermoelectric converter 100, the thermoelectric conversion elements having the optimum thermoelectric conversion temperature can be used depending on the expected temperature difference. Thus, efficient thermoelectric conversion can be performed reliably.

Figure 7:
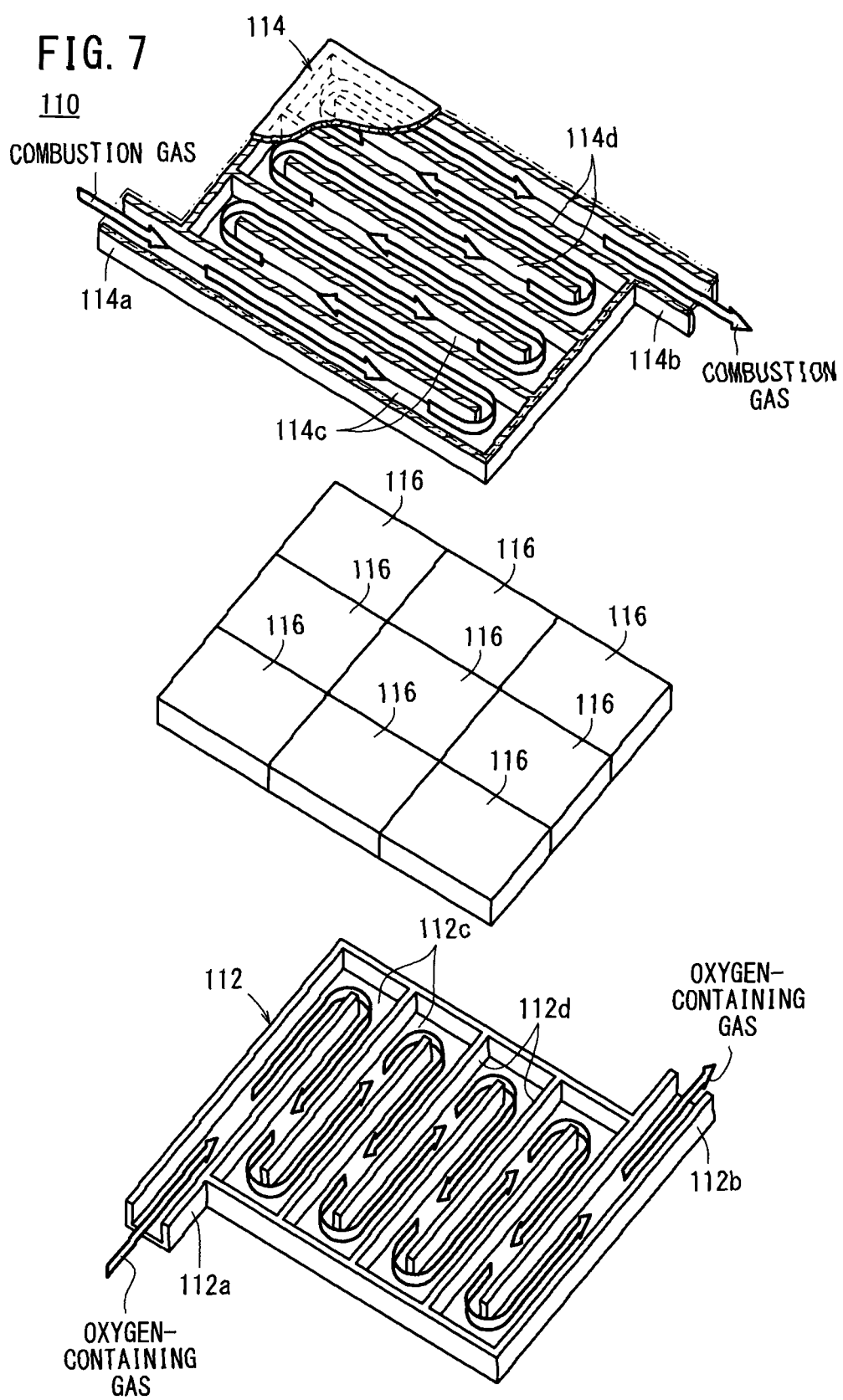
FIG. 7 is an exploded perspective view showing main components of a thermoelectric converter of a fuel cell module according to a fourth embodiment of the present invention.

FIG. 7 is an exploded perspective view showing main components of a thermoelectric converter 110 of a fuel cell module according to a fourth embodiment of the present invention.

The thermoelectric converter 110 includes a first channel member 112 as a passage of the oxygen-containing gas, a second channel member 114 as a passage of the combustion gas, and a plurality of thermoelectric conversion elements 116 provided between the first channel member 112 and the second channel member 114. The thermoelectric conversion elements 116 have a predetermined thermoelectric conversion temperature.

The first channel member 112 includes a serpentine oxygen-containing gas channel 112*c* extending in a serpentine pattern between an oxygen-containing gas inlet 112*a* and an oxygen-containing gas outlet 112*b*. The serpentine oxygen-containing gas channel 112*c* is formed by partition plates 112*d* provided alternately in a zigzag pattern in the first channel member 112.

The second channel member 114 includes a serpentine combustion gas channel 114*c* extending in a serpentine pattern between a combustion gas inlet 114*a* and a combustion gas outlet 114*b*. The serpentine combustion gas channel 114*c* is formed by partition plates 114*d* provided alternately in a zigzag pattern in the second channel member 114. The combustion gas in the serpentine combustion gas channel 114*c* and the oxygen-containing gas in the serpentine oxygen-containing gas channel 112*c* flow in a manner that the combustion gas and the oxygen-containing gas intersect with each other.

In the fourth embodiment having the above structure, in the thermoelectric converter 110, the combustion gas and the oxygen-containing gas flow in a manner that the combustion gas and the oxygen-containing gas intersect with each other. The thermoelectric converter 110 includes the plurality of thermoelectric conversion elements 116 having a predetermined thermoelectric conversion temperature. In the structure, in the thermoelectric converter 110, the thermoelectric conversion elements 116 having the optimum thermoelectric conversion temperature can be used depending on the expected temperature difference. Thus, efficient thermoelectric conversion can be performed reliably.

Figure 8:
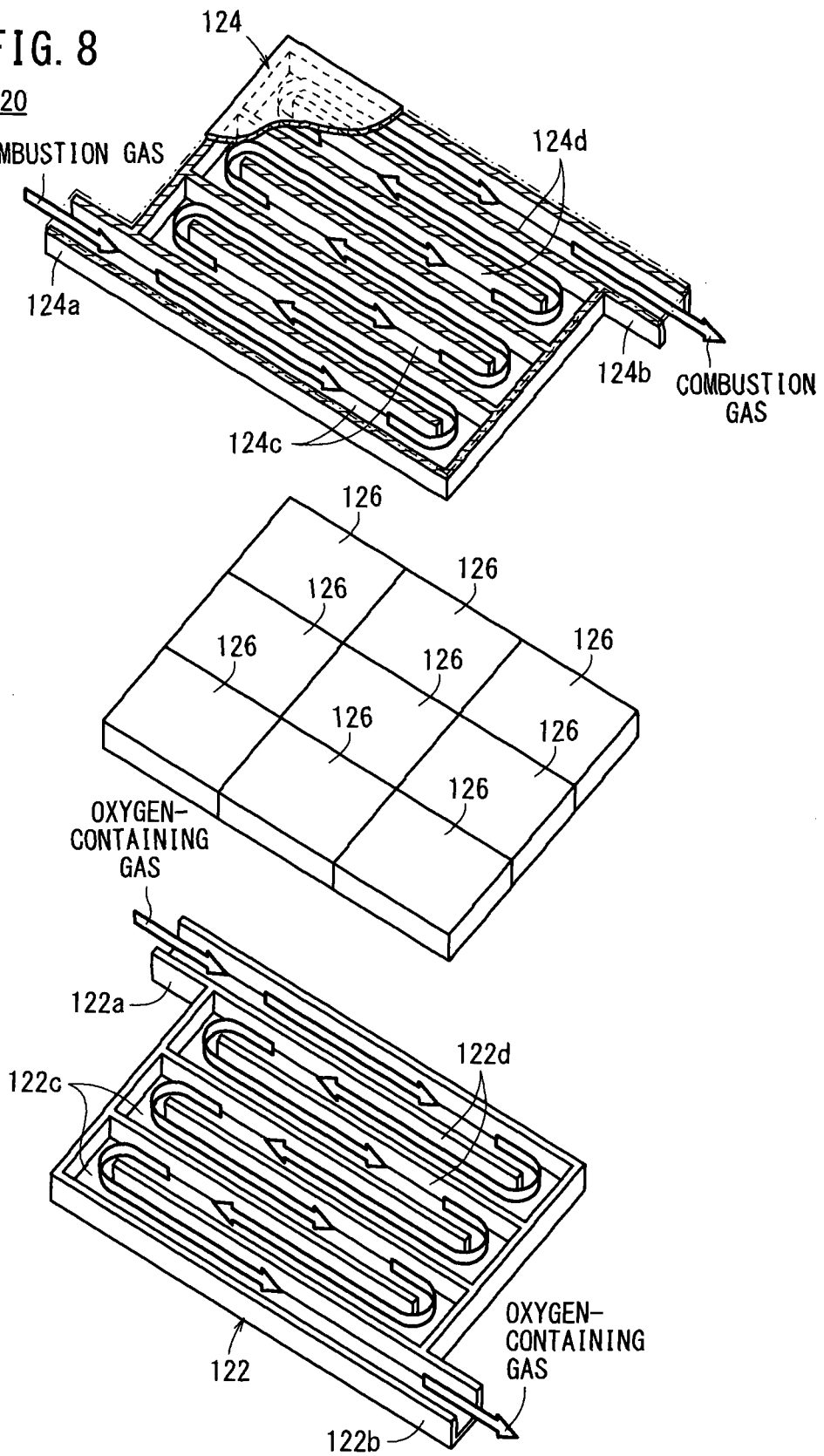
FIG. 8 is an exploded perspective view showing main components of a thermoelectric converter of a fuel cell module according to a fifth embodiment of the present invention.
Figure 9:
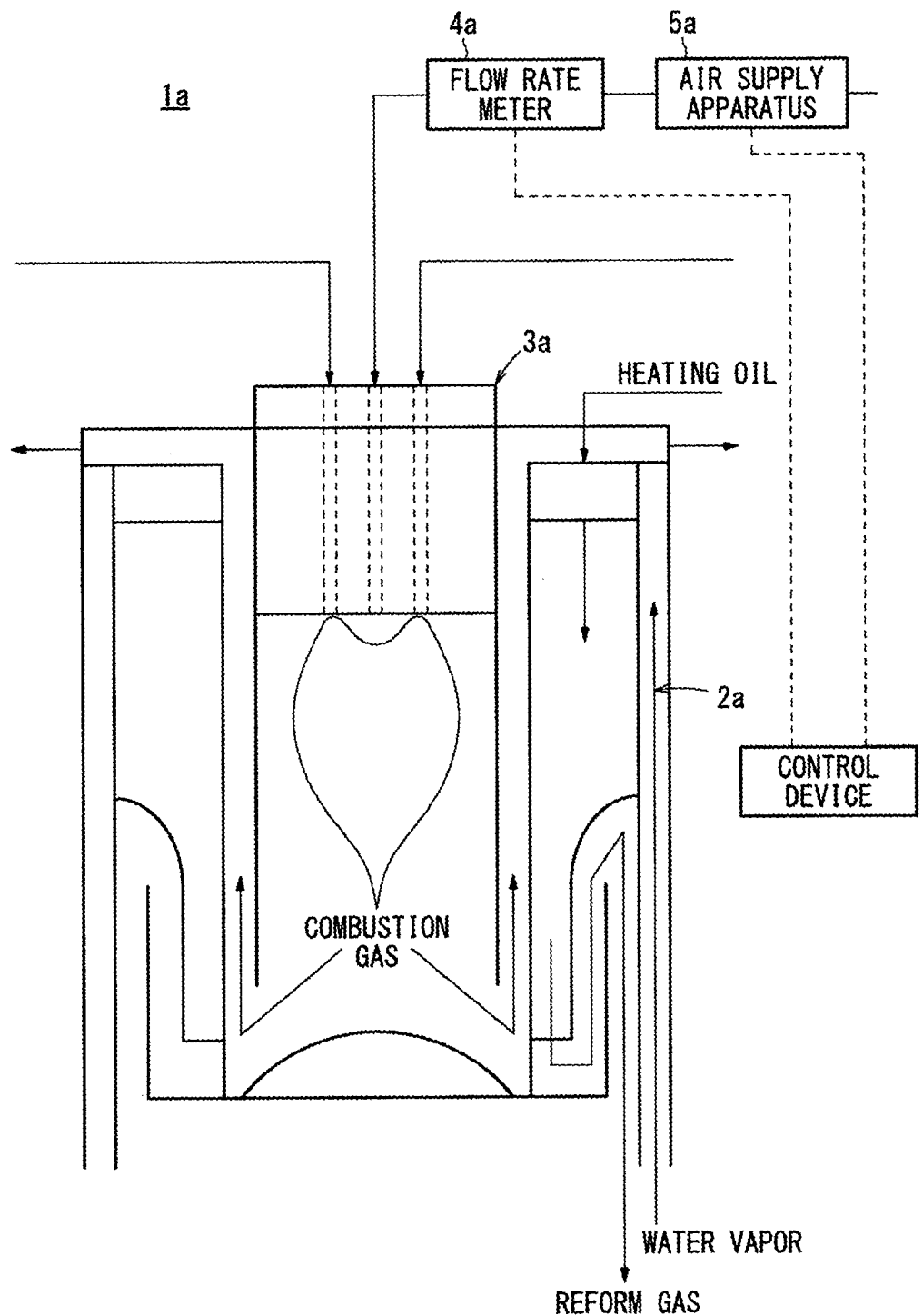
FIG. 9 is a diagram showing a fuel cell system disclosed in the conventional technique 1.
Figure 10:
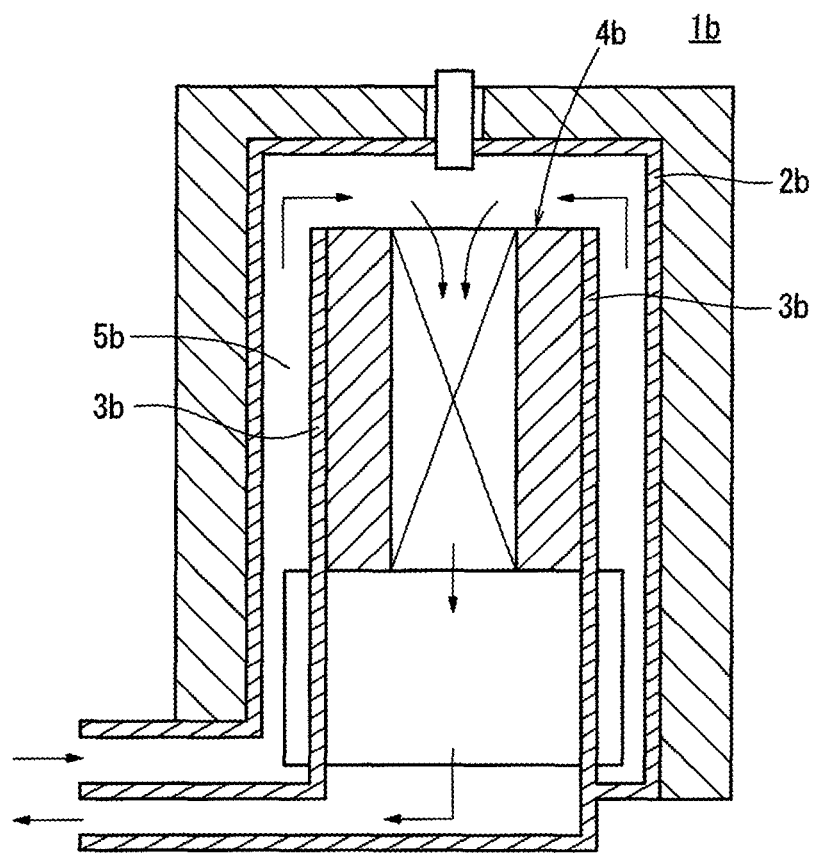
FIG. 10 is a view showing a partial oxidation reformer disclosed in the conventional technique 2.

FIG. 8 is an exploded perspective view showing main components of a thermoelectric converter 120 of a fuel cell module according to a fifth embodiment of the present invention.

The thermoelectric converter 120 includes a first channel member 122 as a passage of the oxygen-containing gas, a second channel member 124 as a passage of the combustion gas, and a plurality of thermoelectric conversion elements 126 provided between the first channel member 122 and the second channel member 124. The thermoelectric conversion elements 126 have a predetermined thermoelectric conversion temperature.

The first channel member 122 includes a serpentine oxygen-containing gas channel 122*c* extending in a serpentine pattern between an oxygen-containing gas inlet 122*a* and an oxygen-containing gas outlet 122*b*. The serpentine oxygen-containing gas channel 122*c* is formed by partition plates 122*d* provided alternately in a zigzag pattern in the first channel member 122.

The second channel member 124 includes a serpentine combustion gas channel 124*c* extending in a serpentine pattern between a combustion gas inlet 124*a* and a combustion gas outlet 124*b*. The serpentine combustion gas channel 124*c* is formed by partition plates 124*d* provided alternately in a zigzag pattern in the second channel member 124. The combustion gas in the serpentine combustion gas channel 124*c* and the oxygen-containing gas in the serpentine oxygen-containing gas channel 122*c* flow symmetrically with each other.

In the fifth embodiment having the above structure, in the thermoelectric converter 120, the combustion gas and the oxygen-containing gas flow symmetrically with each other. The thermoelectric converter 120 includes the plurality of thermoelectric conversion elements 126 having a predetermined thermoelectric conversion temperature. In the structure, in the thermoelectric converter 120, the thermoelectric conversion elements 126 having the optimum thermoelectric conversion temperature can be used depending on the expected temperature difference. Thus, efficient thermoelectric conversion can be performed reliably.

Although certain embodiments of the present invention have been shown and described in detail, it should be understood that various changes and modifications may be made to the embodiments without departing from the scope of the invention as set forth in the appended claims.

The invention claimed is:

1. A fuel cell module comprising:
a fuel cell stack for generating electricity by electrochemical reactions of a fuel gas and an oxygen-containing gas;
a partial oxidation reformer for reforming a mixed gas of the oxygen-containing gas and a raw fuel chiefly containing hydrocarbon to produce the fuel gas, and supplying the fuel gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce a combustion gas; and
a heat exchanger for raising a temperature of the oxygen-containing gas by heat exchange with the combustion gas, and supplying the oxygen-containing gas to the fuel cell stack;
wherein the heat exchanger is provided on one side of the fuel cell stack, and the partial oxidation reformer and the exhaust gas combustor are provided on the other side of the fuel cell stack;
the partial oxidation reformer is provided around the exhaust gas combustor;
the fuel cell module includes
a thermoelectric converter for performing thermoelectric conversion based on a temperature difference between the combustion gas and the oxygen-containing gas,
a combustion gas channel for supplying the combustion gas discharged from the exhaust gas combustor successively to the fuel cell stack and the heat exchanger, and
an oxygen-containing gas channel for supplying the oxygen-containing gas to the heat exchanger and the partial oxidation reformer,
the oxygen-containing gas channel is branched into a first oxygen-containing pas supply channel for supplying the oxygen-containing gas to the heat exchanger and a second oxygen-containing gas supply channel for supplying the oxygen-containing gas to the partial oxidation reformer,
an oxygen-containing gas regulator valve for regulating a distribution amount of the oxygen-containing gas is provided at a branch portion,
the thermoelectric converter is provided downstream of the heat exchanger in the combustion gas channel, and upstream of the heat exchanger and the partial oxidation reformer in the oxygen-containing gas channel,
the thermoelectric converter includes
a first thermoelectric converter placed in the first oxygen-containing gas supply channel at a position of the first oxygen-containing gas supply channel downstream of the oxygen-containing gas regulator valve, and
a second thermoelectric converter placed in the second oxygen-containing gas supply channel at a position of the second oxygen-containing gas supply channel downstream of the oxygen-containing gas regulator valve, and
the combustion gas flows through the combustion gas channel in a direction from the first thermoelectric converter to the second thermoelectric converter.

2. The fuel cell module according to claim 1, wherein the combustion gas and the oxygen-containing gas flow in the thermoelectric converter in parallel to each other, and the thermoelectric converter includes a plurality of thermoelectric conversion elements each having a different thermoelectric conversion temperature.

3. The fuel cell module according to claim 1, wherein the combustion gas and the oxygen-containing gas flow in the thermoelectric converter in a counterflow manner, and the thermoelectric converter includes a plurality of thermoelectric conversion elements having a predetermined thermoelectric conversion temperature.

4. The fuel cell module according to claim 1, wherein the combustion gas and the oxygen-containing gas flow in the thermoelectric converter in a manner that the combustion gas and the oxygen-containing gas intersect with each other, and the thermoelectric converter includes a plurality of thermoelectric conversion elements having a predetermined thermoelectric conversion temperature.

5. The fuel cell module according to claim 1, wherein the combustion gas and the oxygen-containing gas flow in the thermoelectric converter symmetrically with each other, and the thermoelectric converter includes a plurality of thermoelectric conversion elements having a predetermined thermoelectric conversion temperature.

6. The fuel cell module according to claim 1, wherein the heat exchanger is provided on one side of the fuel cell stack in a stacking direction; and
the partial oxidation reformer and the exhaust gas combustor are provided on the other side of the fuel cell stack in the stacking direction.

7. The fuel cell module according to claim 1, wherein the fuel cell module is a solid oxide fuel cell module.

* * * * *